(12) United States Patent
Jia

(10) Patent No.: US 12,294,667 B2
(45) Date of Patent: May 6, 2025

(54) FOLDABLE APPARATUS FOR DRIVING FLEXIBLE MEMBER TO UNFOLD OR FOLD, ELECTRONIC DEVICE INCLUDING FOLDABLE APPARATUS AND FLEXIBLE MEMBER, AND CONTROL METHOD OF ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 416 days.

(21) Appl. No.: 17/836,761

(22) Filed: Jun. 9, 2022

(65) Prior Publication Data
US 2022/0303370 A1    Sep. 22, 2022

Related U.S. Application Data

(63) Continuation of application No. PCT/CN2020/133123, filed on Dec. 1, 2020.

(30) Foreign Application Priority Data

Dec. 13, 2019 (CN) .......................... 201911290895.6

(51) Int. Cl.
H04M 1/02 (2006.01)
(52) U.S. Cl.
CPC ....... *H04M 1/0216* (2013.01); *H04M 1/0268* (2013.01)
(58) Field of Classification Search
CPC ........ G06F 1/16; G06F 1/1615; G06F 1/1652; G06F 1/1679; G06F 1/0266;
(Continued)

(56) References Cited

U.S. PATENT DOCUMENTS 9,840,861 B1    12/2017  Maatta
10,536,566 B1 *  1/2020  Cheng ................. H04M 1/0243
(Continued)

FOREIGN PATENT DOCUMENTS

CN    103294113 A    9/2013
CN    204592757 U    8/2015
(Continued)

OTHER PUBLICATIONS (CN 110263509 A) >>> Unlocking Method, Device, Electronic Apparatus and Storage Medium (see title). (Year: 2019).*
(Continued)

*Primary Examiner* — Meless N Zewdu
(74) *Attorney, Agent, or Firm* — Young Basile Hanlon & MacFarlane, P.C.

(57) ABSTRACT

A foldable apparatus, an electronic device, and a control method of an electronic device are provided in the present disclosure. The foldable apparatus includes a first connecting portion, a second connecting portion, a first positioning portion fixed to the first connecting portion, and a second positioning portion fixed to the second connecting portion. The first connecting portion and the second connecting portion are respectively configured to be connected with two opposite parts of a flexible member to drive the flexible member to unfold or fold. The first positioning portion is provided with multiple first magnetic portions, and the second positioning portion is provided with a second magnetic portion in magnetic fit with the multiple first magnetic portions. When the second magnetic portion is in magnetic fit with each first magnetic portion, the second connecting portion and the first connecting portion are in a positioned state.

19 Claims, 8 Drawing Sheets

(58) Field of Classification Search
CPC .... G06F 1/1607; G06F 1/1601; G06F 1/1616;
G06F 1/1618; G06F 1/162; G06F 1/1666;
G06F 1/1647; G06F 3/01; H04M 1/02;
H04M 1/0283; H04M 1/0243; H04M
1/0245; H04M 1/0247; H04M 1/0249;
H04M 1/026; H04M 1/0266; H04M
1/0268; H04M 1/0269; H04M 1/021;
H04M 1/0212; H04M 1/0214; H04M
1/0216; H04M 1/0218; H04M 1/022;
H04M 1/0222; H04M 1/0225; H04M
1/0202; H04M 1/0206; H04M 1/0208;
H04M 1/00; H04M 1/725; H04M
2250/12; H04M 1/7246; H04M 1/185;
H04M 1/18; H01Q 9/0485; H01Q 9/00;
H01Q 11/105; H01Q 15/08; H01Q 1/00;
H01Q 9/0407; H01Q 9/065; H01Q
19/005; H01Q 21/061; H01Q 25/00;
H01Q 25/04; H01Q 1/24; H01Q 1/38;
H01Q 5/25; H01Q 9/04; H01Q 1/021;
H01Q 1/523; H01Q 3/2617; H02J 50/10;
H02J 7/02; H02J 50/005; H04B 1/38;
H04B 1/02; H04B 1/103; H04B 1/034;
H04B 1/06; H04B 5/00; H04B 5/22;
H04B 5/24; H04B 5/26; H04B 5/263;
H04B 5/45; H04B 5/48; H04B 5/43;
H04B 7/04; H04B 7/024; H04B 1/0053;
H04B 1/0064; H04B 7/02; H04B 7/022;
H04B 5/40; H04W 4/00; H04W 88/00;
H04W 88/02; H04W 88/08; H04W 4/80;
H04W 88/06; H04W 28/084; H04W 4/70;
H04W 4/029; H04W 60/00; H04W 76/10;
H04W 76/11; H04W 4/50; H04W 4/02;
H04W 4/021; H04W 88/18; G02B 6/443;
G02B 6/4486; H04Q 1/52; H04Q 17/00;
H05K 1/11; H05K 5/03; H04L 61/4511
See application file for complete search history.

(56) References Cited

U.S. PATENT DOCUMENTS

| | | | | |
|---|---|---|---|---|
| 11,960,329 | B2* | 4/2024 | Moon et al. | G06F 1/1681 |
| 2007/0077972 | A1* | 4/2007 | Tu et al. | 455/575.5 |
| 2007/0285341 | A1* | 12/2007 | Manning | 345/1.3 |
| 2009/0061961 | A1* | 3/2009 | Ueta | 455/575.3 |
| 2012/0194978 | A1* | 8/2012 | Huang et al. | 361/679.01 |
| 2016/0070306 | A1 | 3/2016 | Shin et al. | |
| 2016/0094693 | A1* | 3/2016 | Song et al. | H04M 1/0208 |
| 2016/0278222 | A1 | 9/2016 | Lee | |
| 2018/0049336 | A1 | 2/2018 | Manuel et al. | |
| 2018/0059734 | A1 | 3/2018 | Knoppert et al. | |
| 2019/0025889 | A1 | 1/2019 | Szeto | |
| 2019/0258295 | A1* | 8/2019 | Fujimoto | G06F 1/1652 |
| 2020/0042037 | A1* | 2/2020 | Sun | G06F 1/163 |

FOREIGN PATENT DOCUMENTS

| | | |
|---|---|---|
| CN | 105491193 A | 4/2016 |
| CN | 205692091 U | 11/2016 |
| CN | 106205385 A | 12/2016 |
| CN | 106486020 A | 3/2017 |
| CN | 108292147 A | 7/2018 |
| CN | 108417152 A | 8/2018 |
| CN | 208739154 U | 4/2019 |
| CN | 209402555 U | 9/2019 |
| EP | 1414219 A1 | 4/2004 |
| WO | 2017120676 A1 | 7/2017 |

OTHER PUBLICATIONS (CN 206128937 U) >>> A Composition Capable of Regulating Angle Locating and Closing Hinge (see title) (Year: 2017).*
(CN 107393424 A) >>> Foldable Component and Flexible Display Device (title) (Year: 2017).*
(CN 102156510 B) >>> Accessory Device With Magnetic Attachment (see title) (Year: 2015) (Year: 2015).*
(KR 20190062107 A) >>> Foldable Flexible Display Device (see title) (Year: 2019).*
WIPO International search report and Written Opinion with English Translation for International Application No. PCT/CN2020/133123 dated Mar. 8, 2021.
China first office action with English Translation issued in corresponding CN application No. 201911290895.6 dated Aug. 20, 2020.
China Notice of allowance with English Translation issued in corresponding CN application No. 201911290895.6 dated Jan. 27, 2021.
Extended European Search Report for EP Application 20899962.3 mailed Dec. 15, 2022. (11 pages).

* cited by examiner

FOLDABLE APPARATUS FOR DRIVING FLEXIBLE MEMBER TO UNFOLD OR FOLD, ELECTRONIC DEVICE INCLUDING FOLDABLE APPARATUS AND FLEXIBLE MEMBER, AND CONTROL METHOD OF ELECTRONIC DEVICE

CROSS-REFERENCE TO RELATED APPLICATION(S)

This application is a continuation application of International Application No. PCT/CN2020/133123, filed on Dec. 1, 2020, which claims priority to Chinese Patent Application No. 201911290895.6 filed on Dec. 13, 2019, the entire disclosures of both of which are incorporated herein by reference.

TECHNICAL FIELD

This disclosure relates to the field of communication devices, and in particular to a foldable apparatus, an electronic device, and a control method of an electronic device.

BACKGROUND

At present, in a foldable mobile phone, a display screen of a mobile phone is folded in half to realize miniaturization of the mobile phone and facilitate a user to carry the mobile phone. However, at present, the foldable mobile phone is unable to be folded-and-positioned, which results in a form of the foldable mobile phone is unable to be kept.

SUMMARY

A foldable apparatus is provided in implementations of the present disclosure, where the foldable apparatus includes a first connecting portion, a second connecting portion which is able to be unfolded or folded relative to the first connection portion, a first positioning portion fixed to the first connecting portion, and a second positioning portion fixed to the second connecting portion. The first connecting portion and the second connecting portion are respectively configured to be connected with two opposite parts of a flexible member to drive the flexible member to unfold or fold. The first positioning portion is provided with multiple first magnetic portions, and the second positioning portion is provided with a second magnetic portion in magnetic fit with the multiple first magnetic portions. When the second magnetic portion is in magnetic fit with each first magnetic portion, the second connecting portion and the first connecting portion are in a positioned state.

An electronic device is provided in implementations of the present disclosure, where the electronic device includes the above foldable apparatus.

A control method of an electronic device is provided in implementations of the present disclosure. The electronic device includes a flexible member and a foldable apparatus. The method includes the following. A rotation form is received. A preset included angle corresponding to the rotation form is determined. A current rotation included angle of two non-bendable portions of the flexible member is obtained and whether the rotation included angle meets the preset included angle is determined. A compensation included angle according to the rotation included angle and the preset included angle is determined in a case that the rotation included angle does not meet the preset included angle. The two non-bendable portions of the flexible member are driven to rotate to the preset included angle according to the compensation included angle.

BRIEF DESCRIPTION OF DRAWINGS

In order to describe technical solutions of the disclosure more clearly, the following will give a brief introduction to the accompanying drawings used for describing the implementations. Apparently, the accompanying drawings hereinafter described are merely some implementations of the present disclosure. Based on these drawings, those of ordinary skill in the art can also obtain other drawings without creative effort.

DETAILED DESCRIPTION

Technical solutions of implementations of the present disclosure will be described clearly and completely, with reference to accompanying drawings in the implementations of the present disclosure.

Figure 1:
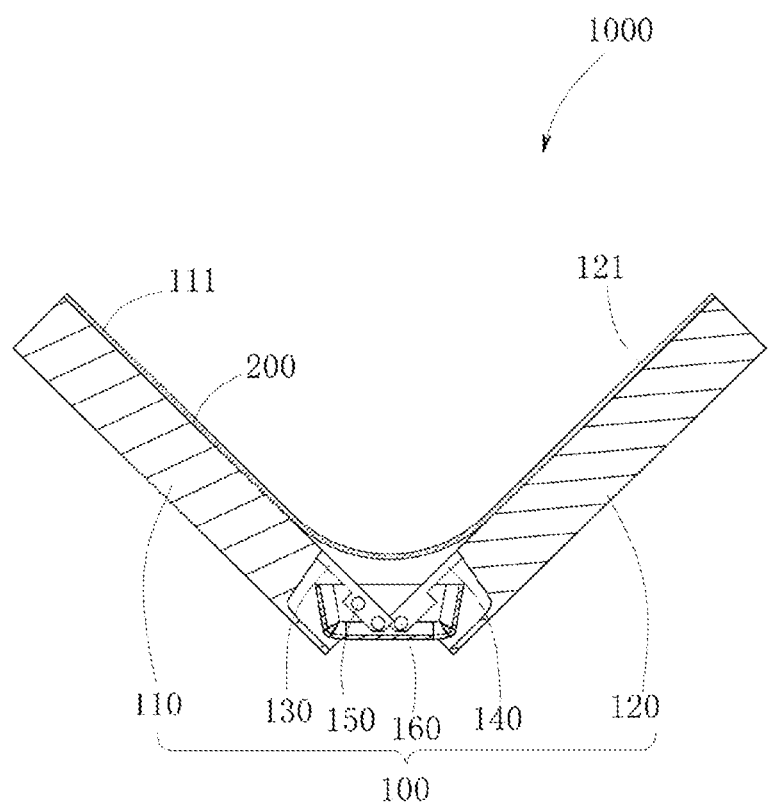
FIG. 1 is a schematic cross-sectional view of an electronic device provided by implementations of the present disclosure.
Figure 2:
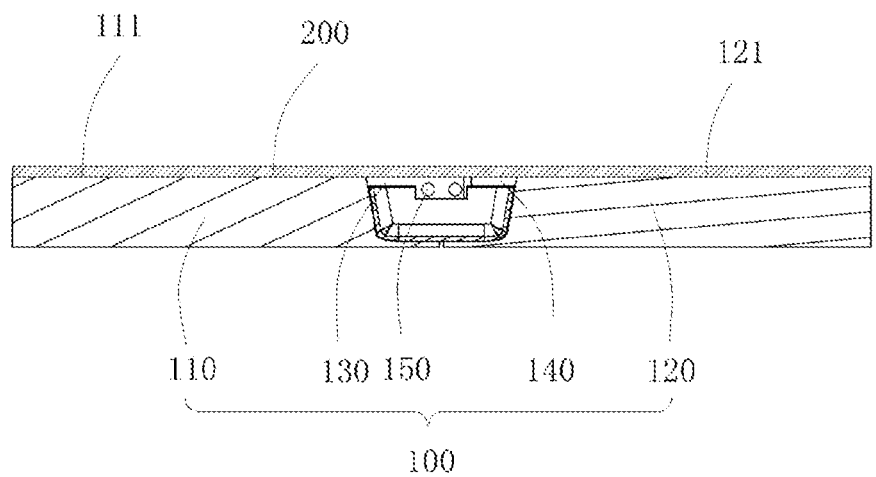
FIG. 2 is a schematic cross-sectional view of an electronic device in an unfolded state provided by implementations of the present disclosure.
Figure 3:
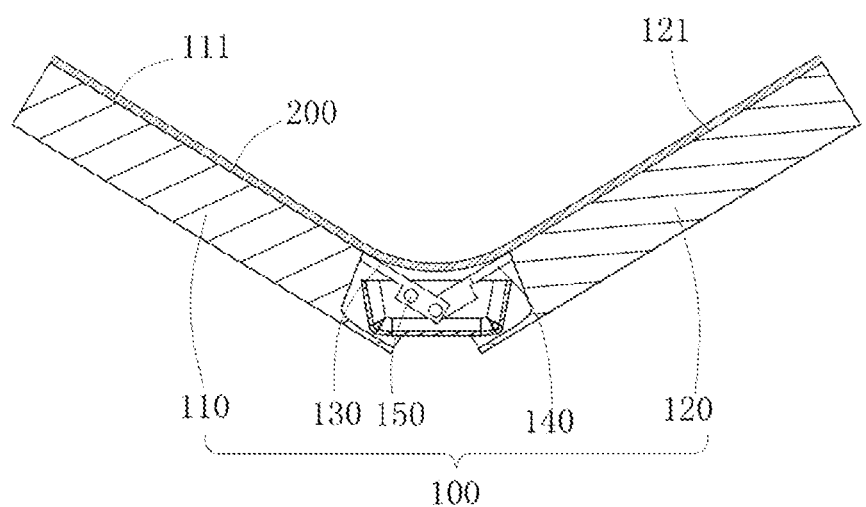
FIG. 3 is a schematic cross-sectional view of an electronic device in an included angle bending state provided by implementations of the present disclosure.

Reference can be made to FIG. 1, FIG. 2, and FIG. 3, an electronic device 1000 is provided in the present disclosure, and the electronic device 1000 includes a foldable apparatus 100 and a flexible member 200. The foldable apparatus 100 includes a first connecting portion 110, a second connecting portion 120 which is able to be unfolded or folded relative to the first connection portion 110, a first positioning portion 130 fixed to the first connecting portion 110, and a second positioning portion 140 fixed to the second connecting portion 120. The first connecting portion 110 and the second connecting portion 120 are respectively configured to be connected with two opposite parts of the flexible member 200 to drive the flexible member 200 to unfold or fold. The first positioning portion 130 is provided with multiple first magnetic portions 150, and the second positioning portion 140 is provided with a second magnetic portion 160 which can be in magnetic fit with the multiple first magnetic portions 150. When the second magnetic portion 160 is in magnetic fit with each first magnetic portion 150, the second connecting portion 120 and the first connecting portion 110 are in a positioned state. It can be understood that the electronic device 1000 may be a device such as a mobile phone, a tablet computer, a laptop, etc.

The first positioning portion 130 is provided with the multiple first magnetic portions 150, the second positioning portion 140 is provided with the second magnetic portion 160 which can be in magnetic fit with the multiple first magnetic portions 150, and when the second magnetic portion 160 is in magnetic fit with each first magnetic portion 150, the second connecting portion 120 and the first connecting portion 110 are in a positioned state, such that a rotation included angle can be limited in a folding process of the first connecting portion 110 and the second connecting portion 120, so as to keep various forms of the foldable apparatus 100.

Figure 4:
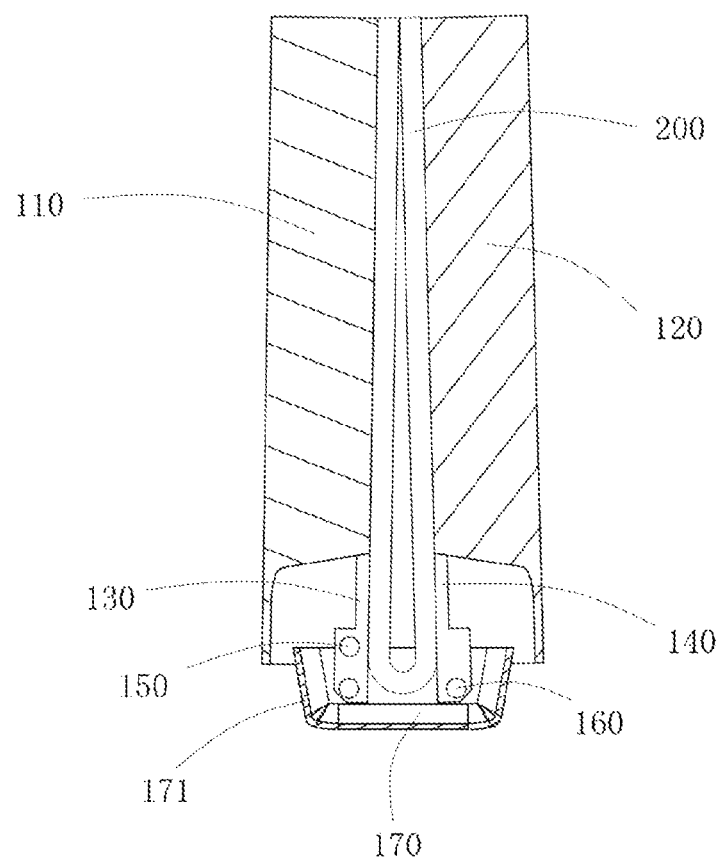
FIG. 4 is a schematic cross-sectional view of an electronic device in a folded state provided by implementations of the present disclosure.

In the implementations, reference can be made to FIG. 2, FIG. 3, and FIG. 4, and the first connecting portion 110 can rotate relative to the second connecting portion 120. The first connecting portion 110 and the second connecting portion 120 can be fixed to the two opposite parts of the flexible member 200. The first connecting portion 110 and the second connecting portion 120 respectively drive the two opposite parts of the flexible member 200 to unfold or fold, so as to enable the flexible member 200 to present an unfolded state or a folded state. The first connecting portion 110 can rotate relative to the second connecting portion 120 to an included angle state, so as to drive the flexible member 200 to bend in the included angle state. A first magnetic portion 150 of the first positioning portion 130 is in magnetic fit with the second magnetic portion 160 of the second positioning portion 140, such that when a rotation driving force for the first connecting portion 110 and the second connecting portion 120 is removed, the first connecting portion 110 and the second connecting portion 120 are kept in a fixed state relative to each other. In other words, the flexible member 200 can be kept in an unfolded state, a folded state, or an included angle bending state, such that the electronic device 1000 can keep a variety of forms. Of course, in other implementations, the first connecting portion 110 and the second connecting portion 120 may also be slidably connected with the two opposite parts of the flexible member 200 respectively, to compensate for a bending length difference of the foldable apparatus 100 relative to the flexible member 200.

Specifically, the first connecting portion 110 has a first contact surface 111 and the second connecting portion 120 has a second contact surface 121. The first contact surface 111 and the second contact surface 121 each are flat surfaces. The first contact surface 111 and the second contact surface 121 are in contact with the two opposite parts of the flexible member 200 respectively, such that the flexible member 200 has two opposite non-bendable portions. The flexible member 200 can be bent between the two opposite non-bendable portions. The flexible member 200 is a flexible display screen. When the flexible member 200 is kept in an unfolded state, the electronic device 1000 can provide a large-area display screen. When the flexible member 200 is kept in a folded state, the two non-bendable portions of the flexible member 200 are folded relative to each other, and the electronic device 1000 is convenient to be carried. When the two non-bendable portions of the flexible member 200 are kept in an included angle state, the electronic device 1000 can present a laptop-like mode.

It can be understood that the first positioning portion 130 and the second positioning portion 140 move relative to each other along with the first connecting portion 110 and the second connecting portion 120 respectively. The first connecting portion 110 is taken as a base, and in a process that the second connecting portion 120 rotates relative to the first connecting portion 110, the second magnetic portion 160 can be in magnetic fit with the multiple first magnetic portions 150 successively. The multiple first magnetic portions 150 are on a motion trajectory of the second magnetic portion 160 rotating relative to first connecting portion 110. The second magnetic portion 160 is in magnetic fit with one of first magnetic portions 150, and the second connecting portion 120 rotates to a stationary position relative to the first connecting portion 110. In addition, a certain included angle is defined between the second connecting portion 120 and the first connecting portion 110, an included angle between the first contact surface 111 and the second contact surface 121 can be understood as the included angle between the first connecting portion 110 and the second connecting portion 120, and the included angle ranges from 0° to 180°. Obviously, when the first connecting portion 110 and the second connecting portion 120 drive the flexible member 200 to be in a folded state respectively, the included angle between the first connecting portion 110 and the second connecting portion 120 is approximately 0°. When the first connecting portion 110 and the second connecting portion 120 drive the flexible member 200 to be in an unfolded state respectively, the included angle between the first connecting portion 110 and the second connecting portion 120 is approximately 180°. The second magnetic portion 160 can be in fit with the multiple first magnetic portions 150, such that the first connecting portion 110 and the second connecting portion 120 can be positioned at various included angles of rotation. In other words, the flexible member 200 presents various positioned states, such that the electronic device 1000 can keep various forms, and application scenarios of the electronic device 1000 can be increased.

It can be understood that the second positioning portion 140 may also be provided with multiple second magnetic portions 160 and the multiple second magnetic portions 160 are in fit with the multiple first magnetic portions 150, to improve magnetic stability of the first positioning portion 130 and the second positioning portion 140. The multiple second magnetic portions 160 are arranged on a motion trajectory of the first positioning portion 130 rotating relative to the second connecting portion 120.

Figure 5:
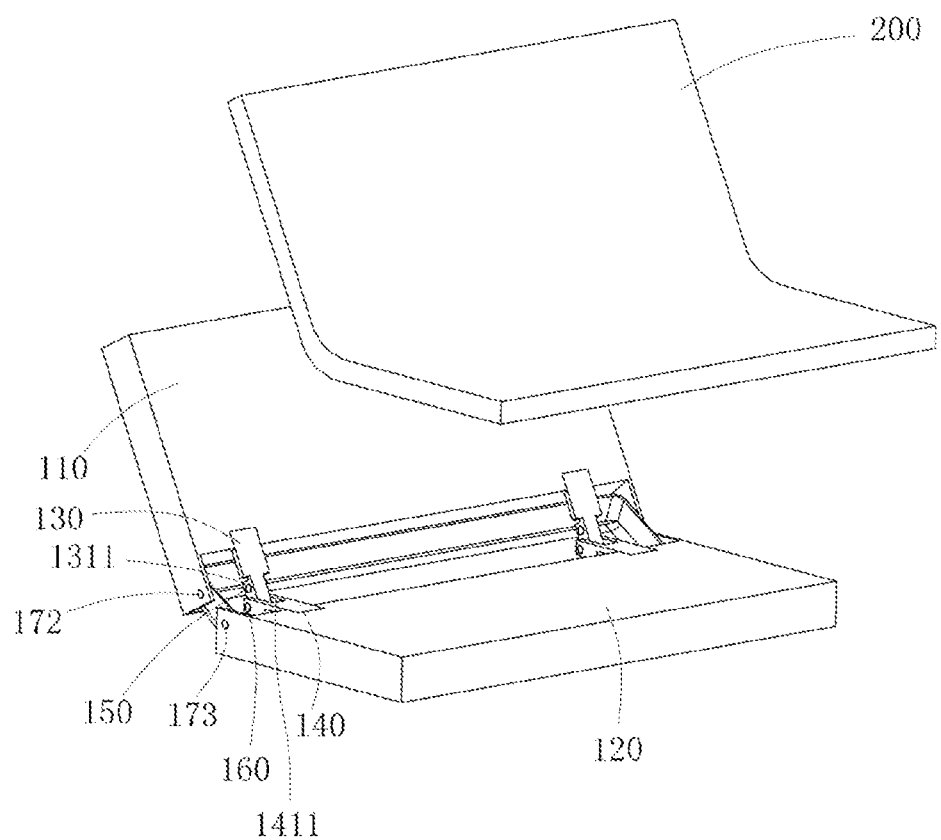
FIG. 5 is a three-dimensional exploded schematic view of an electronic device in an included angle bending state provided by implementations of the present disclosure.
Figure 6:
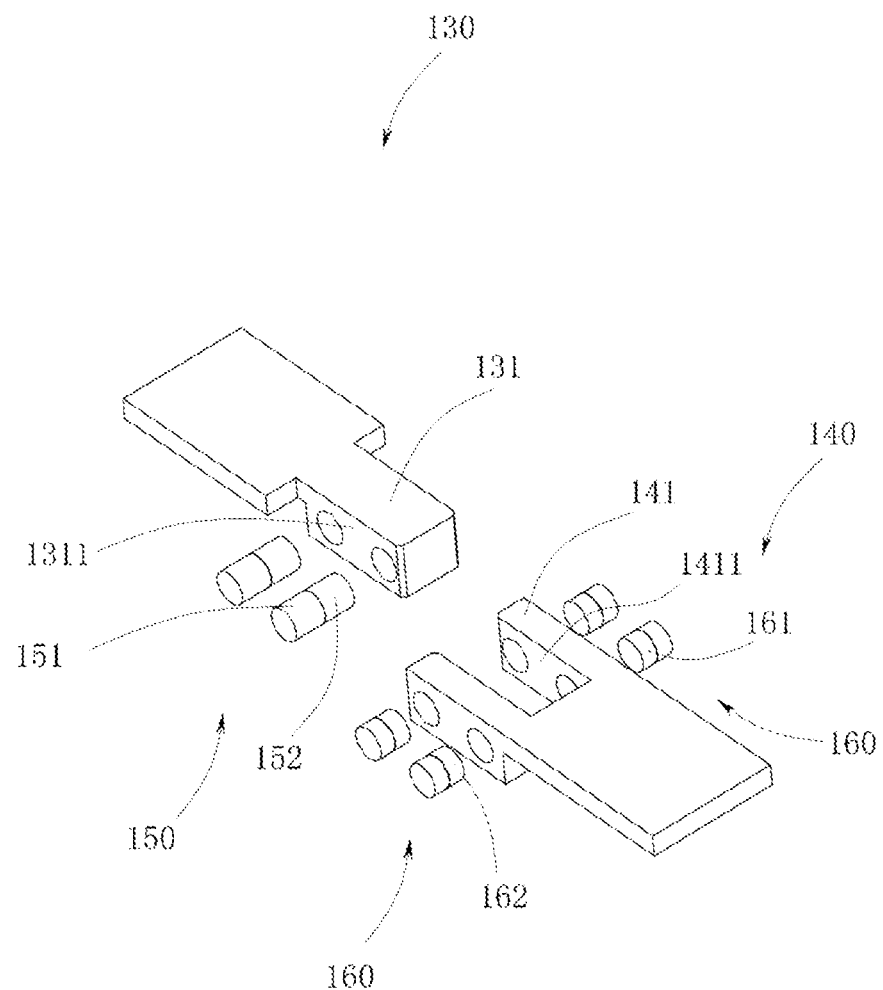
FIG. 6 is a three-dimensional exploded schematic view of fit of a first positioning portion and a second positioning portion of an electronic device provided by the implementations of the present disclosure.
Figure 7:
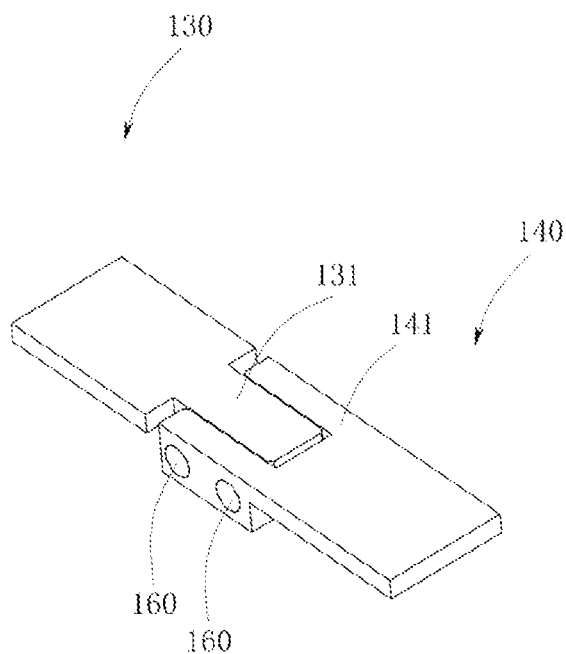
FIG. 7 is a three-dimensional schematic view of fit of a first positioning portion and a second positioning portion of an electronic device provided by the implementations of the present disclosure.

Furthermore, reference can be made to FIG. 5, FIG. 6, and FIG. 7, and the foldable apparatus 100 further includes a rotating shaft portion 170. The first connecting portion 110 and the second connecting portion 120 are disposed at two opposite sides of the rotating shaft portion 170, and the first connecting portion 110 rotates around the rotating shaft portion 170 and is unfolded or folded relative to the second connecting portion 120.

In the implementations, the rotating shaft portion 170 provides a rotating shaft for the first connecting portion 110 relative to the second connecting portion 120. The rotating shaft portion 170 may be rotatably connected with each of the first connecting portion 110 and the second connecting portion 120, that is, the first connecting portion 110 and the second connecting portion 120 each can rotate around the rotating shaft portion 170, such that the first connecting portion 110 can be unfolded or folded relative to the second connecting portion 120. The rotating shaft portion 170 may also be fixedly connected with the first connecting portion 110 and be rotatably connected with the second connecting portion 120, that is, the second connecting portion 120 can rotate around the rotating shaft portion 170 and the first connecting portion 110 is fixed relative to the rotating shaft portion 170, such that the first connecting portion 110 can be unfolded or folded relative to the second connecting portion 120. The rotating shaft portion 170 may also be fixedly connected with the second connecting portion 120 and rotatably connected with the first connecting portion 110.

In the implementations, the rotating shaft portion 170 has a rotating shaft base 171 and a first rotating shaft 172 and a second rotating shaft 173 which are rotatably connected with the rotating shaft base 171. The first rotating shaft 172 is fixedly connected with the first connecting portion 110, and the second rotating shaft 173 is fixedly connected with the second connecting portion 120, such that the first connecting portion 110 and the second connecting portion 120 rotate around the rotating shaft portion 170 respectively. The first rotating shaft 172 and the second rotating shaft 173 are arranged side by side, such that when the first connecting portion 110 and the second connecting portion 120 are folded relative to each other, an accommodating space which is able to accommodate a bendable portion of the flexible member 200 is defined between the first connecting portion 110 and the second connecting portion 120. Of course, in other implementations, the first rotating shaft 172 and the second rotating shaft 173 may also coincide, such that the first connecting portion 110 and the second connecting portion 120 can rotate around the same rotating shaft of the rotating shaft portion 170.

It can be understood that when the flexible member 200 is in an unfolded state, the first connecting portion 110 and the second connecting portion 120 can support the two non-bendable portions of the flexible member 200 respectively, and the rotating shaft portion 170 substantially supports the bendable portion of the flexible member 200. When the flexible member 200 is in a folded state, the first connecting portion 110 and the second connecting portion 120 drive the two non-bendable portions of the flexible member 200 to fold respectively. The accommodating space defined among the first connecting portion 110, the second connecting portion 120, and the rotating shaft portion 170 can accommodate the bendable portion of the flexible member 200, to prevent the bendable portion of the flexible member 200 from being squeezed and damaged. The bendable portion of the flexible member 200 is substantially bent in a water droplet shape.

Furthermore, the first positioning portion 130 is fixedly connected with the first connecting portion 110 at a place of the first connecting portion 110 adjacent to the rotating shaft portion 170, and the second positioning portion 140 is fixedly connected with the second connecting portion 120 at a place of the second connecting portion 120 adjacent to the rotating shaft portion 170.

In the implementations, the first positioning portion 130 is adjacent to the rotating shaft portion 170, such that a rotation radius of the first positioning portion 130 is reduced, thus reducing a volume of the first positioning portion 130. The second positioning portion 140 is adjacent to the rotating shaft portion 170, such that a rotation radius of the second positioning portion 140 is reduced, thus reducing a volume of the second positioning portion 140, which can reduce an overall volume of the electronic device 1000 and facilitate the electronic device 1000 to be carried. Specifically, the first positioning portion 130 is arranged at an edge of the first connecting portion 110 connected with the rotating shaft portion 170. The first positioning portion 130 and the first connecting portion 110 can be arranged side by side. The rotating shaft portion 170 and a part of the first positioning portion 130 away from the first connecting portion 110 can be stacked with each other, to facilitate positioned fit of the first positioning portion 130 and the second positioning portion 140.

It can be understood that when the flexible member 200 is in an unfolded state or in an included angle bending state, the first positioning portion 130 partially overlaps the second positioning portion 140. An overlapping part of the first positioning portion 130 and the second positioning portion 140 is located between the bendable portion of the flexible member 200 and the rotating shaft portion 170, such that a use space between the flexible member 200 and the rotating shaft portion 170 is reasonably optimized. When the flexible member 200 is in a folded state, the first positioning portion 130 and the second positioning portion 140 are in a state of being separated or tending to be separated from each other, and the first positioning portion 130 and the second positioning portion 140 can be folded with each other relative to the rotating shaft portion 170 to increase the accommodating space among the first connecting portion 110, the second connecting portion 120, and the rotating shaft portion 170, which facilitates using the accommodating space to accommodate the bendable portion of the flexible member 200.

In the implementations, the first positioning portion 130 is implemented as multiple first positioning portions 130 and the second positioning portion 140 is implemented as multiple second positioning portions 140 in the foldable apparatus 100. The multiple first positioning portions 130 are arranged at regular intervals in a length direction of a side edge of the first connecting portion 110 adjacent to the rotating shaft portion 170, the multiple second positioning portions 140 are arranged at regular intervals in a length direction of a side edge of the second connecting portion 120 adjacent to the rotating shaft portion 170, and the multiple second positioning portions 140 are in magnetic fit with the multiple first positioning portions 130 respectively.

Specifically, the foldable apparatus 100 includes two first positioning portions 130 and two second positioning portions 140. The two first positioning portions 130 are close to two ends of the rotating shaft portion 170 in a length direction respectively. The two second positioning portions 140 are in magnetic fit with the two first positioning portions 130 respectively. A gap is defined between the two first positioning portions 130, such that a device arrangement space in the rotating shaft portion 170 is defined between the two first positioning portions 130 and between the two second positioning portions 140. Functional devices are arranged in the device arrangement space, such that a use space of the rotating shaft portion 170 is reasonably optimized. The two first positioning portions 130 are in magnetic fit with the two second positioning portions 140 respectively, such that positioned stability of the first connecting portion 110 and the second connecting portion 120 is improved.

Furthermore, when a first magnetic portion 150 is in magnetic fit with the second magnetic portion 160, the first positioning portion 130 is spaced apart from the second positioning portion 140.

In the implementations, one end of the first positioning portion 130 is fixed to the first connecting portion 110, and the other end of the first positioning portion 130 is in fit with the second positioning portion 140. The first positioning portion 130 has an inserting plate 131 at an end of the first positioning portion 130 away from the first connecting portion 110. The inserting plate 131 can be in fit with the second positioning portion 140. The inserting plate 131 has two opposite first mating surfaces 1311. First magnetic portions 150 are magnets. The first magnetic portions 150 have first south magnetic poles 151 and first north magnetic poles 152. The first south magnetic poles 151 and the first north magnetic poles 152 penetrate through the two opposite first mating surfaces 1311 respectively. One end of the second positioning portion 140 is fixed to the second connecting portion 120, and the other end of the second positioning portion 140 is in fit with the first positioning portion 130. The second positioning portion 140 has two engaging plates 141 at an end away from the second connecting portion 120. The two engaging plates 141 have two second mating surfaces 1411 at inner sides of the two engaging plates 141 respectively, and a slot which can be in inserting fit with the inserting plate 131 is defined between the two second mating surfaces 1411. The second magnetic portion 160 is two magnets penetrating through the two engaging plates 141 respectively. Each second magnetic portion 160 has a second south magnetic pole 161 and a second north magnetic pole 162 which penetrate through the two second mating surfaces 1411 respectively. The second south magnetic pole 161 can be in magnetic fit with a first north magnetic pole 152 and the second north magnetic pole 162 can be in magnetic fit with a first south magnetic pole 151, to improve magnetic stability of the second magnetic portion 160 and the first magnetic portion 150, thus improving positioned stability of the first positioning portion 130 and the second positioning portion 140. When the second magnetic portion 160 is in magnetic fit with the first magnetic portion 150, end portions of the first magnetic portion 150 penetrate through first mating surfaces 1311, end portions of the second magnetic portion 160 penetrate through second mating surfaces 1411, the end portions of the first magnetic portion 150 penetrating through the first mating surfaces 1311 are in magnetic fit with the end portions of the second magnetic portion 160 penetrating through the second mating surfaces 1411, and the first mating surfaces 1311 are in clearance fit with the second mating surfaces 1411. The first mating surfaces 1311 and the second mating surfaces 1411 all are perpendicular to an axial direction of the rotating shaft portion 170, and a magnetic attraction force between the first magnetic portion 150 and the second magnetic portion 160 is parallel to the axial direction of the rotating shaft portion 170, such that the first mating surfaces 1311 are always in fit with the second mating surfaces 1411 in a state of being parallel to each other, and the first positioning portion 130 and the second positioning portion 140 always move with zero friction. In a process that the second magnetic portion 160 moves to be in fit with the next first magnetic portion 150, the first mating surfaces 1311 still keep in clearance fit with the second mating surfaces 1411, that is, in a process that the first positioning portion 130 is in positioned fit with the second positioning portion 140, zero friction is always kept to reduce rotation resistance between the first connecting portion 110 and the second connecting portion 120.

It can be understood that when the first magnetic portion 150 is in magnetic fit with the second magnetic portion 160, the end of the first positioning portion 130 away from the first connecting portion 110 is inserted between the two engaging plates 141. The end portion of the first positioning portion 130 is stacked with engaging plates 141 in a length direction of the rotating shaft, and the first magnetic portion 150 is stacked with the second magnetic portion 160 in a direction parallel to a length of the rotating shaft, such that a magnetic attraction force between the first between the first magnetic portion 150 and the second magnetic portion 160 is substantially parallel to a length direction of the rotating shaft portion 170, a strength of a mutual magnetic attraction force between the first magnetic portion 150 and the second magnetic portion 160 that limits mutual rotation of the first connecting portion 110 and the second connecting portion 120 is increased.

In an implementation, reference can be made to FIG. 5 and FIG. 6, the first positioning portion 130 is provided with two first magnetic portions 150, and second positioning portion 140 is provided with two second magnetic portions 160. The two first magnetic portions 150 are substantially arranged in a direction perpendicular to the length of the rotating shaft portion 170. The two second magnetic portions 160 are substantially arranged in a direction perpendicular to the length of the rotating shaft portion 170. Of course, in other implementations, if the first positioning portion 130 is provided with multiple first magnetic portions 150, the multiple first magnetic portions 150 may also be arranged in a circular curve. If the second positioning portion 140 is provided with multiple second magnetic portions 160, the multiple second magnetic portions 160 may also be arranged in a circular curve.

In order to conveniently distinguish the two first magnetic portions 150, a first magnetic portion 150 away from the first connecting portion 110 is defined as a first front-end magnetic portion 150, and a first magnetic portion 150 close to the first connecting portion 110 is defined as a first tail-end magnetic portion 150. In addition, in order to conveniently distinguish the two second magnetic portions 160, a second magnetic portion 160 away from the second connecting portion 120 is defined as a second front-end magnetic portion 160, and a second magnetic portion 160 close to the second connecting portion 120 is defined as a second tail-end magnetic portion 160.

Reference can be made to FIG. 5, when the second front-end magnetic portion 160 is in magnetic fit with the first front-end magnetic portion 150 and the second tail-end magnetic portion 160 is separated from the first tail-end magnetic portion 150, a distance between an edge of the first connecting portion 110 close to the rotating shaft portion 170 and an edge of the second connecting portion 120 close to the rotating shaft portion 170 is lengthened, and then a distance between an edge of the first connecting portion 110 away from the rotating shaft portion 170 and an edge of the second connecting portion 120 away from the rotating shaft portion 170 is shortened. In other words, the first connecting portion 110 and the second connecting portion 120 are in an included angle state relative to each other, and the included angle is an obtuse angle. The two non-bendable portions of the flexible member 200 are disposed at an included angle, one non-bendable portion can be used as a computer keyboard, and the other non-bendable portion can be used for display, such that the electronic device 1000 has a laptop-like structure.

Figure 8:
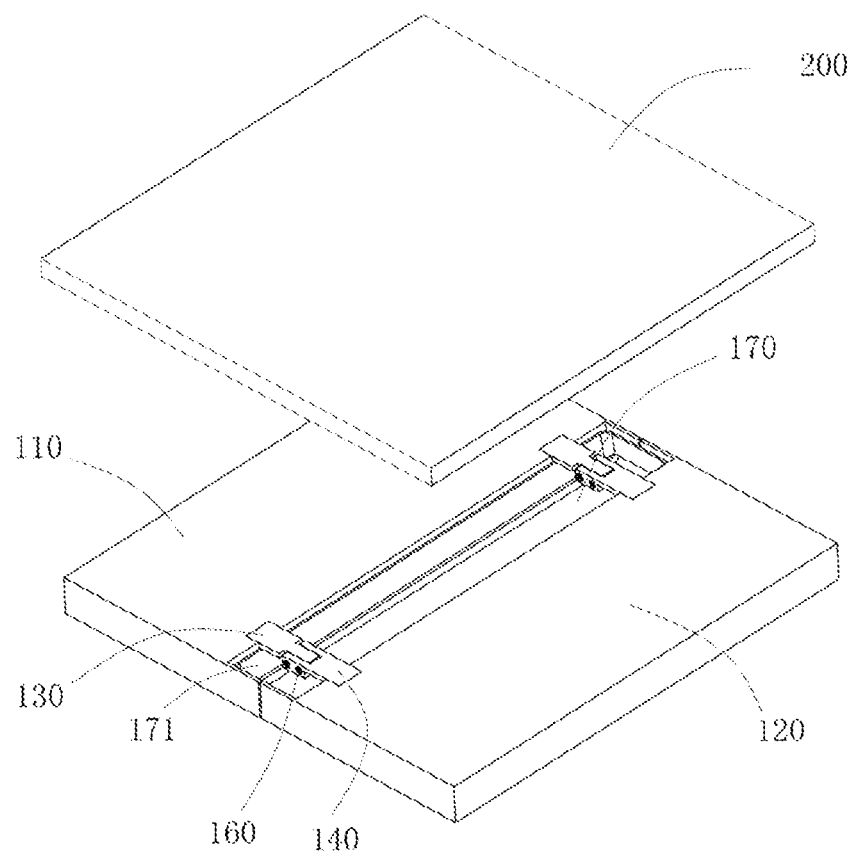
FIG. 8 is a three-dimensional exploded schematic view of an electronic device in an unfolded state provided by implementations of the present disclosure.

Of course, in other implementations, it can be understood that by adjusting a position of the first front-end magnetic portion 150 relative to the first connecting portion 110 and adjusting a position of the second front-end magnetic portion 160 relative to the second connecting portion 120, when the first front-end magnetic portion 150 is in magnetic fit with the second front-end magnetic portion 160, the distance between the edge of the first connecting portion 110 close to the rotating shaft portion 170 and the edge of the second connecting portion 120 close to the rotating shaft portion 170 is lengthened to a maximum state, and then the edge of the first connecting portion 110 away from the rotating shaft portion 170 is in contact with the edge of the second connecting portion 120 away from the rotating shaft portion 170, that is, the first connecting portion 110 and the second connecting portion 120 can be in an folded state. Reference can be made to FIG. 8, when the second front-end magnetic portion 160 is in magnetic fit with the first tail-end magnetic portion 150 and the second tail-end magnetic portion 160 is in magnetic fit with the first front-end magnetic portion 150, the distance between the edge of the first connecting portion 110 close to the rotating shaft portion 170 and the edge of the second connecting portion 120 close to the rotating shaft portion 170 is shortened to a state of being in contact with each other, and then the distance between the edge of the first connecting portion 110 away from the rotating shaft portion 170 and the edge of the second connecting portion 120 away from the rotating shaft portion 170 is lengthened to a maximum state. In other words, the first connecting portion 110 and the second connecting portion 120 are unfolded relative to each other, and the flexible member 200 is in an unfolded state, such that the electronic device 1000 can keep in a tablet-computer-like state.

Of course, in other implementations, it can be understood that by adjusting a position of the first tail-end magnetic portion 150 relative to the first connecting portion 110 and adjusting a position of the second tail-end magnetic portion 160 relative to the second connecting portion 120, when the first tail-end magnetic portion 150 is in magnetic fit with the second front-end magnetic portion 160 and the first front-end magnetic portion 150 is in fit with the second tail-end magnetic portion 160, the distance between the edge of the first connecting portion 110 close to the rotating shaft portion 170 and the edge of the second connecting portion 120 close to the rotating shaft portion 170 is shortened to a preset distance state, and then the distance between the edge of the first connecting portion 110 away from the rotating shaft portion 170 and the edge of the second connecting portion 120 away from the rotating shaft portion 170 is lengthened to a preset distance state. In other words, the first connecting portion 110 and the second connecting portion 120 can be in an included state.

Figure 9:
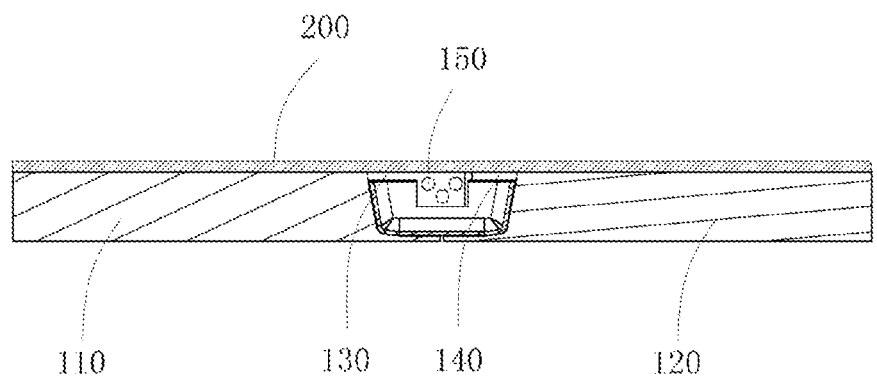
FIG. 9 is a schematic cross-sectional view of an electronic device in an unfolded state provided in other implementations of the present disclosure.
Figure 10:
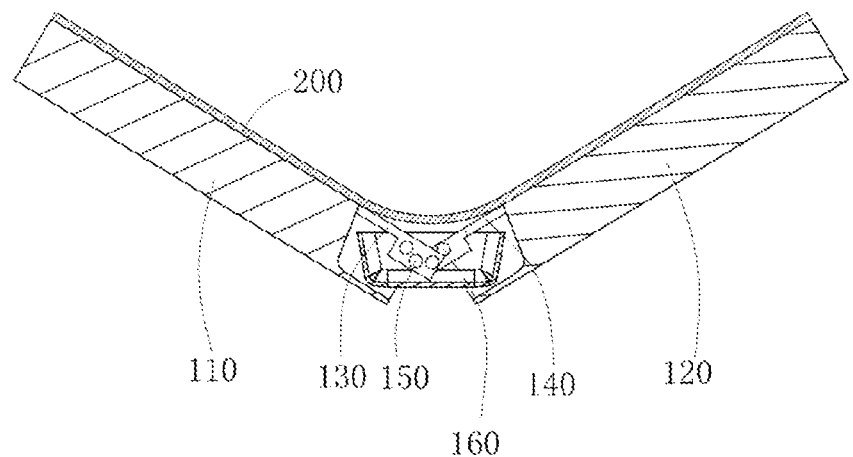
FIG. 10 is a schematic cross-sectional view of an electronic device in an included angle bending state provided by other implementations of the present disclosure.
Figure 11:
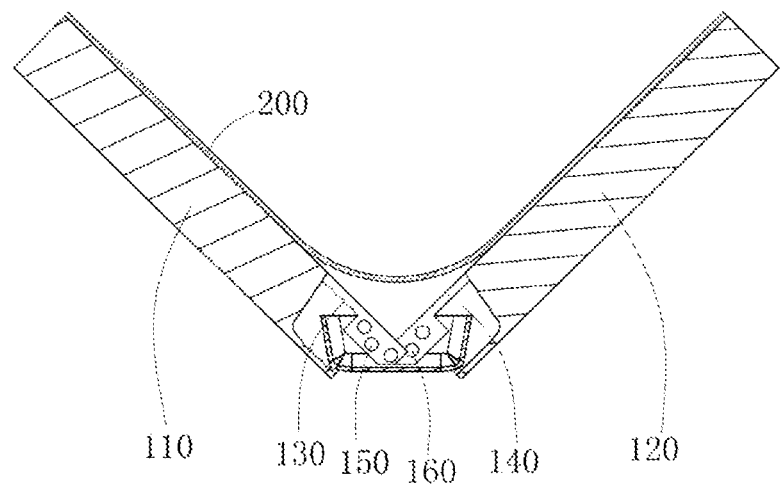
FIG. 11 is a schematic cross-sectional view of an electronic device in another included angle bending state provided by other implementations of the present disclosure.
Figure 12:
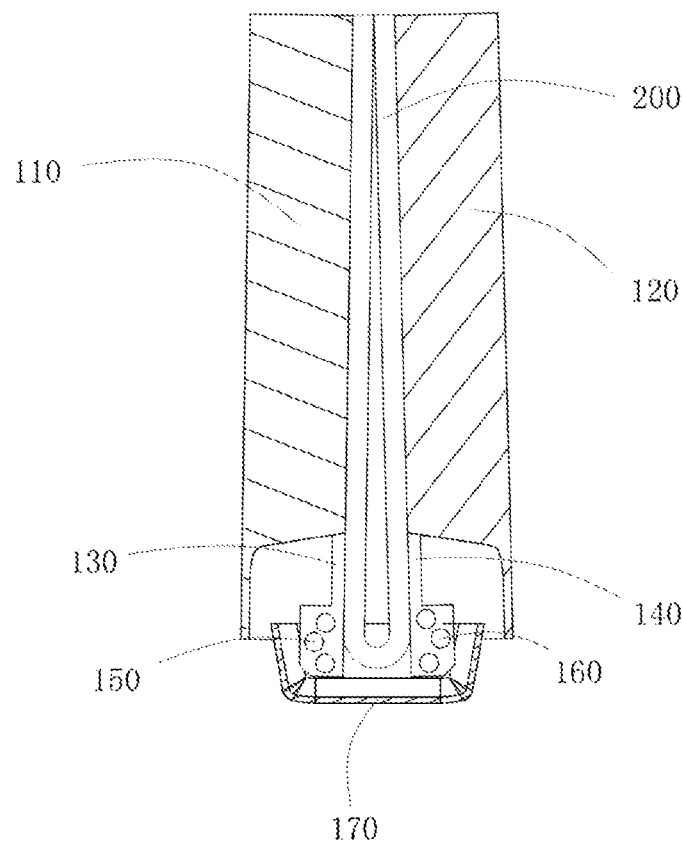
FIG. 12 is a schematic cross-sectional view of an electronic device in a folded state provided by other implementations of the present disclosure.

In another implementation, reference can be made to FIG. 9, which is substantially the same as the implementations illustrated in FIG. 8, except that the first positioning portion 130 is provided with three first magnetic portions 150 and the second positioning portion 140 is provided with three second magnetic portions 160. When the three first magnetic portions 150 are in magnetic fit with the three second magnetic portions 160 respectively, the first connecting portion 110 and the second connecting portion 120 are unfolded relative to each other, and the flexible member 200 is in an unfolded state. Reference can be made to FIG. 10, and when two of the three first magnetic portions 150 are in magnetic fit with two of the three second magnetic portions 160, the first connecting portion 110 and the second connecting portion 120 drive the two non-bendable portions of the flexible member 200 to be in an included state relative to each other. Reference can be made to FIG. 11, and when one of the three first magnetic portions 150 is in magnetic fit with one of the three second magnetic portions 160, the first connecting portion 110 and the second connecting portion 120 are in another included state relative to each other. Reference can be made to FIG. 12, and when the first positioning portion 130 and the second positioning portion 140 are separated from each other, the first connecting portion 110 and the second connecting portion 120 are folded relative to each other, and the flexible member 200 is in a folded state.

Of course, in other implementations, it may also be that when one of the three first magnetic portions 150 is in magnetic fit with one of the three second magnetic portions 160, the first connecting portion 110 and the second connecting portion 120 can be folded relative to each other, and the flexible member 200 is in a folded state.

Figure 13:
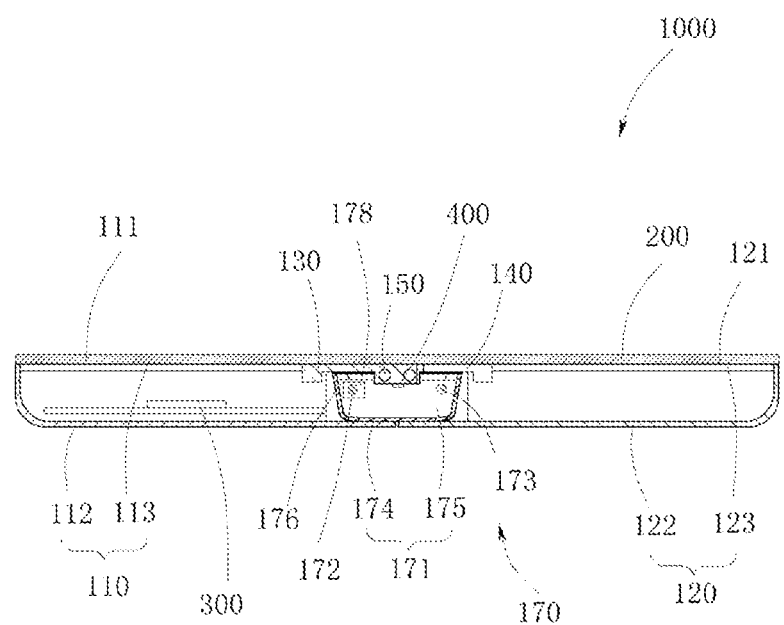
FIG. 13 is a schematic cross-sectional view of an electronic device in an unfolded state provided by other implementations of the present disclosure.

Furthermore, reference can be made to FIG. 13, the first connecting portion 110 includes a first housing 112 and a first cover plate 113 covering the first housing 112, and the first positioning portion 130 is fixed to the first cover plate 113 at a side of the first cover plate 113 facing the first housing 112. The second connecting portion 120 includes a second housing 122 and a second cover plate 123 covering the second housing 122, and the second positioning portion 140 is fixed to the second cover plate 123 at a side of the second cover plate 123 facing the second housing 122.

In the implementations, the first contact surface 111 and the second contact surface 121 are disposed at a surface of the first cover plate 113 away from the first housing 112 and a surface of the second cover plate 123 away from the second housing 122 respectively. The first cover plate 113 and the second cover plate 123 are fixedly in contact with the two non-bendable portions of the flexible member 200 respectively. The first positioning portion 130 substantially extends in a direction parallel to the first cover plate 113, and the second positioning portion 140 substantially extends in a direction parallel to the second cover plate 123. The first positioning portion 130 is substantially flush with the first cover plate 113 and the second positioning portion 140 is substantially flush with the second cover plate 123. When the first connecting portion 110 and the second connecting portion 120 are unfolded relative to each other, the first positioning portion 130 and the second positioning portion 140 are substantially flush with each other, such that the first positioning portion 130 and the second positioning portion 140 can effectively support a partial bendable portion of the flexible member 200. Of course, in other implementations, the first positioning portion 130 may also be fixed to the first housing 112 at a side of the first housing 112 facing the first cover plate 113, and the second positioning portion 140 may also be fixed to the second housing 122 at a side of the second housing 122 facing the second cover plate 123. A misalignment may also be formed between the first positioning portion 130 and the first cover plate 113, and a misalignment may also be formed between the second positioning portion 140 and the second cover plate 123.

Furthermore, the rotating shaft base 171 includes a rotating shaft housing 174 and a bearing member 175 fixed to the rotating shaft housing 174. The first connecting portion 110 and the second connecting portion 120 are rotatably connected with the bearing member 175 respectively, such that the first connecting portion 110 and the second connecting portion 120 can rotate around the rotating shaft portion 170.

In the implementations, the first rotating shaft 172 and the second rotating shaft 173 are fixedly connected with the first housing 112 and the second housing 122 respectively. The bearing member 175 is fixed in the rotating shaft housing 174. The rotating shaft housing 174 defines an accommodating cavity 176. When the flexible member 200 is in a folded state, the bendable portion of the flexible member 200 is partially accommodated in the accommodating cavity 176, and an end portion of the first positioning portion 130 and an end portion of the second positioning portion 140 can be accommodated in the accommodating cavity 176, such that the electronic device 1000 has a smaller volume in a folded state. The rotating shaft base 171 is further provided with a synchronous transmission assembly in the rotating shaft housing 174. The synchronous transmission assembly is connected with the first rotating shaft 172 and the second rotating shaft 173 respectively, such that the first connecting portion 110 and the second connecting portion 120 can synchronously rotate around the rotating shaft portion 170. The synchronous transmission assembly can be composed of multiple gears, and the multiple gears can synchronously transmit torque of the first rotating shaft 172 to the second rotating shaft 173.

Furthermore, the electronic device 1000 further includes a driving member 178 disposed between the first connecting portion 110 and the second connecting portion 120, and the driving member 178 is configured to drive the first connecting portion 110 and the second connecting portion 120 to rotate relative to each other.

In the implementations, the driving member 178 can be fixed in the rotating shaft housing 174, and the driving member 178 is configured to drive the first rotating shaft 172 or drive the second rotating shaft 173 to rotate. The driving member 178 is an electric machine. The electronic device 1000 further includes a processor 300 fixed in the first housing 112 or the second housing 122. The processor 300 is electrically coupled with the driving member 178. The processor 300 is configured to transmit a driving instruction to the driving member 178, so as to control the driving member 178 to drive the first rotating shaft 172 or the second rotating shaft 173 to rotate.

Furthermore, the electronic device 1000 further includes a Hall sensor 400 fixed to the foldable apparatus 100. The Hall sensor 400 is configured to sense a magnetic field signal of the first magnetic portion 150 or the second magnetic portion 160. The processor 300 is configured to convert the magnetic field signal of the Hall sensor 400 into an included angle value between the first connecting portion 110 and the second connecting portion 120. The processor 300 is further electrically coupled with the driving member 178, and the processor 300 is configured to transmit a driving signal to the driving member 178 according to the included angle value.

In the implementations, the Hall sensor 400 may be fixed to the first positioning portion 130 to detect a magnetic field strength of the second magnetic portion 160. The Hall sensor 400 may also be fixed to the second positioning portion 140 to detect a magnetic field strength of the first magnetic portions 150. The Hall sensor 400 can detect a magnetic field strength of the first magnetic portion 150 or the second magnetic portions 160 to recognize a rotation angle of the first connecting portion 110 relative to the second connecting portion 120, so as to recognize an included angle between two non-bendable portions of the flexible member 200, such that forms of the flexible member 200 can be controlled as needed.

It can be understood that when the flexible member 200 needs to be bent to a preset included angle state, the electronic device 1000 receives a rotation form, and the rotation form can be obtained by receiving an input instruction through a signal input device. It can be understood that the input instruction may be formed by receiving a touch instruction through the flexible member 200, receiving a voice instruction through a receiver, or receiving a press control instruction through a button. The processor 300 is configured to obtain a corresponding rotation form according to the input instruction from a memory. The processor 300 is configured to obtain a preset included angle in the rotation form. The processor 300 is configured to obtain a rotation included angle detected by the Hall sensor 400, determine whether the rotation included angle meets the preset included angle, and transmit a prompting signal to a signal output device if the rotation included angle meets the preset included angle. The signal output device may be a speaker, a display, a fill light, or other devices. If the rotation included angle does not meet the preset included angle, a compensation included angle is determined according to the rotation included angle and the preset included angle. The processor 300 is configured to transmit the compensation included angle to the driving member 178, and the driving member 178 is configured to drive the first rotating shaft 172 or the second rotating shaft 173 according to the compensation included angle, such that the first connecting portion 110 and the second connecting portion 120 drive the two non-bendable portions of the flexible member 200 to rotate to a preset included angle position.

The above are the preferable implementations of the present disclosure. It should be noted that, for those of ordinary skill in the art, without departing from a concept of the present disclosure, several modifications and improvements can be made, and these modifications and improvements are also regard as the protection scope of the present disclosure.

What is claimed is:
1. A foldable apparatus, comprising:
a first connecting portion;
a second connecting portion which is able to be unfolded or folded relative to the first connection portion;
a first positioning portion fixed to the first connecting portion; and
a second positioning portion fixed to the second connecting portion, wherein,
the first connecting portion and the second connecting portion are respectively configured to be connected with two opposite parts of a flexible member to drive the flexible member to unfold or fold, the first positioning portion is provided with a plurality of first magnetic portions, the second positioning portion is provided with a second magnetic portion in magnetic fit with the plurality of the first magnetic portions, and the second connecting portion and the first connecting portion are in a positioned state when the second magnetic portion is in magnetic fit with each first magnetic portion;
wherein the first positioning portion has an inserting plate, the plurality of the first magnetic portions are embedded in the inserting plate, the second positioning portion has two opposite engaging plates, a slot which enables the inserting plate to be inserted is defined between the two engaging plates, and the second magnetic portion is embedded in the engaging plates.

2. The foldable apparatus of claim 1, further comprising: a rotating shaft portion, wherein the first connecting portion and the second connecting portion are disposed at two opposite sides of the rotating shaft portion, and the first connecting portion rotates around the rotating shaft portion and is unfolded or folded relative to the second connecting portion.

3. The foldable apparatus of claim 2, wherein the rotating shaft portion has a rotating shaft base and a first rotating shaft and a second rotating shaft which are rotatably connected with the rotating shaft base, the first rotating shaft is fixedly connected with the first connecting portion, and the second rotating shaft is fixedly connected with the second connecting portion; and the first rotating shaft and the second rotating shaft are arranged side by side, and when the first connecting portion and the second connecting portion are folded relative to each other, an accommodating space which is able to accommodate a bendable part of the flexible member is defined between the first connecting portion and the second connecting portion.

4. The foldable apparatus of claim 2, wherein the first positioning portion is fixedly connected with the first connecting portion at a place of the first connecting portion adjacent to the rotating shaft portion, and the second positioning portion is fixedly connected with the second connecting portion at a place of the second connecting portion adjacent to the rotating shaft portion.

5. The foldable apparatus of claim 4, wherein the first positioning portion is implemented as a plurality of first positioning portions and the second positioning portion is implemented as a plurality of second positioning portions, wherein the plurality of the first positioning portions are arranged at regular intervals in a length direction of a side edge of the first connecting portion adjacent to the rotating shaft portion, the plurality of the second positioning portions are arranged at regular intervals in a length direction of a side edge of the second connecting portion adjacent to the rotating shaft portion, and the plurality of the second positioning portions are in magnetic fit with the plurality of the first positioning portions respectively.

6. The foldable apparatus of claim 2, wherein the plurality of the first magnetic portions and the second magnetic portion are located inside the rotating shaft portion.

7. The foldable apparatus of claim 1, wherein the first positioning portion is spaced apart from the second positioning portion, when a first magnetic portion is in magnetic fit with the second magnetic portion.

8. The foldable apparatus of claim 1, wherein the plurality of the first magnetic portions are stacked with the second magnetic portion, when a first magnetic portion is in magnetic fit with the second magnetic portion.

9. The foldable apparatus of claim 1, wherein the first connecting portion and the second connecting portion are in a folded state or an included angle state relative to each other, when the second magnetic portion is in magnetic fit with a first magnetic portion away from the first connecting portion.

10. The foldable apparatus of claim 1, wherein the first connecting portion and the second connecting portion are in an unfolded state relative to each other, when the second magnetic portion is in magnetic fit with a first magnetic portion close to the first connecting portion.

11. The foldable apparatus of claim 1, wherein the inserting plate has two opposite first mating surfaces, the engaging plates have second mating surfaces at inner sides of the engaging plates, the slot is defined between two second mating surfaces, and first mating surfaces are in clearance fit with the second mating surfaces when the inserting plate is inserted in the slot.

12. The foldable apparatus of claim 11, wherein end portions of the plurality of the first magnetic portions penetrate through the first mating surfaces, end portions of the second magnetic portion penetrate through the second mating surfaces, and the end portions of the plurality of the first magnetic portions penetrating through the first mating surfaces are in magnetic fit with the end portions of the second magnetic portion penetrating through the second mating surfaces.

13. The foldable apparatus of claim 11, wherein the first mating surfaces and the second mating surfaces all are perpendicular to an axial direction of the rotating shaft portion, and a magnetic attraction force between the plurality of the first magnetic portions and the second magnetic portion is parallel to the axial direction of the rotating shaft portion.

14. An electronic device, comprising:
a flexible member comprising two unfolded portions opposite to each other; and
a foldable apparatus, comprising:
a first connecting portion;
a second connecting portion which is able to be unfolded or folded relative to the first connection portion;
a first positioning portion fixed to the first connecting portion; and
a second positioning portion fixed to the second connecting portion, wherein,
the first connecting portion and the second connecting portion are respectively configured to be connected with the two unfolded portions of the flexible member to drive the flexible member to unfold or fold, the first positioning portion is provided with a plurality of first magnetic portions, the second positioning portion is provided with a second magnetic portion in magnetic fit with the plurality of the first magnetic portions, and the second connecting portion and the first connecting portion are in a positioned state when the second magnetic portion is in magnetic fit with each first magnetic portion;
wherein the first positioning portion has an inserting plate, the plurality of the first magnetic portions are embedded in the inserting plate, the second positioning portion has two opposite engaging plates, a slot which enables the inserting plate to be inserted is defined between the two engaging plates, and the second magnetic portion is embedded in the engaging plates.

15. The electronic device of claim 14, wherein the flexible member is a flexible display screen.

16. The electronic device of claim 14, wherein the flexible member is located between the first connecting portion and the second connecting portion, when the flexible member is in a folded state.

17. The electronic device of claim 14, further comprising:
a driving member disposed between the first connecting portion and the second connecting portion and configured to drive the first connecting portion and the second connecting portion to rotate relative to each other.

18. The electronic device of claim 17, further comprising:
a Hall sensor fixed to the foldable apparatus; and
   a processor electrically coupled with the Hall sensor, wherein the Hall sensor is configured to sense a magnetic field signal of the plurality of the first magnetic portions or the second magnetic portion, the processor is configured to convert the magnetic field signal of the Hall sensor into an included angle value between the first connecting portion and the second connecting portion, the processor is further electrically coupled with driving member, and the processor is configured to transmit a driving signal to the driving member according to the included angle value.

19. A method of controlling the electronic device of claim 14, the electronic device further comprising a flexible member and a foldable apparatus, and the method comprising:
   receiving an input instruction, where the input instruction indicates a rotation form;
   determining a preset included angle corresponding to the rotation form;
   obtaining a current rotation included angle of two non-bendable portions of the flexible member and determining whether the rotation included angle meets the preset included angle;
   determining a compensation included angle according to the rotation included angle and the preset included angle in a case that the rotation included angle does not meet the preset included angle; and
   driving the two non-bendable portions of the flexible member to rotate to the preset included angle according to the compensation included angle.

* * * * *